(12) United States Patent
Adams

(10) Patent No.: US 11,758,901 B2
(45) Date of Patent: Sep. 19, 2023

(54) PORTABLE APPARATUS AND METHOD FOR CREATING A HUNTING BLIND

(71) Applicant: Michael Adams, Perkasie, PA (US)

(72) Inventor: Michael Adams, Perkasie, PA (US)

( * ) Notice: Subject to any disclaimer, the term of this patent is extended or adjusted under 35 U.S.C. 154(b) by 62 days.

(21) Appl. No.: 17/484,006

(22) Filed: Sep. 24, 2021

(65) Prior Publication Data
US 2022/0174939 A1    Jun. 9, 2022

Related U.S. Application Data

(60) Provisional application No. 63/122,543, filed on Dec. 8, 2020.

(51) Int. Cl.
| | | |
|---|---|---|
| *A01M 31/02* | (2006.01) | |
| *F16M 13/02* | (2006.01) | |
| *E04H 15/00* | (2006.01) | |
| *A47G 3/00* | (2006.01) | |
| *F16B 35/06* | (2006.01) | |

(52) U.S. Cl.
CPC .......... *A01M 31/025* (2013.01); *F16M 13/02* (2013.01); *A47G 3/00* (2013.01); *E04H 15/001* (2013.01); *F16B 35/06* (2013.01)

(58) Field of Classification Search
CPC .... F16M 13/02; A01M 31/025; E04H 15/001; F16B 23/0069; F16B 35/06; F16B 43/025; A47G 3/00; A47G 33/04; A47G 33/06
See application file for complete search history.

(56) References Cited

U.S. PATENT DOCUMENTS

| | | | | |
|---|---|---|---|---|
| 3,033,504 | A | | 5/1962 | Cronin |
| 3,088,295 | A | * | 5/1963 | Haines ............... A44B 1/28 63/29.1 |
| 3,574,901 | A | * | 4/1971 | Nogue ............... A42B 1/12 24/304 |
| 4,293,243 | A | * | 10/1981 | Graybeal ............ A47G 3/00 411/548 |
| 4,835,024 | A | * | 5/1989 | Hallay ............ B60R 13/005 248/537 |
| 8,066,022 | B2 | * | 11/2011 | Schlipf ............ E04H 15/001 135/147 |

(Continued)

FOREIGN PATENT DOCUMENTS

| | | | | |
|---|---|---|---|---|
| FR | 682815 | A * | 6/1930 | ......... F16B 23/0069 |
| GB | 2082709 | A * | 3/1982 | ......... F16B 23/0069 |

*Primary Examiner* — Eret C McNichols
(74) *Attorney, Agent, or Firm* — Panitch Schwarze Belisario & Nadel LLP

(57) ABSTRACT

The present invention is directed to an apparatus for securing brush to a fixed wooden object to create a hunting blind, the apparatus having a screw having a head and a tip at opposing ends of the screw, the head having a head diameter; and a flange secured to the screw proximate the head, the flange being substantially circular and having a top surface, a base, a flange diameter at least twice the head diameter, a plurality of protrusions situated about an outer edge of the flange, a plurality of recesses, each of the plurality of recesses being disposed about the outer edge of the flange between two of the protrusions and each of the plurality of recesses being configured to receive a user's palm, thumb, and/or fingers to rotate the apparatus, and one or more holes or indentations positioned on or adjacent to at least one of the protrusions.

19 Claims, 4 Drawing Sheets

(56) References Cited

U.S. PATENT DOCUMENTS

| | | | |
|---|---|---|---|
| 9,347,237 B2* | 5/2016 | Ponciano | E04H 15/001 |
| 10,006,624 B2* | 6/2018 | Austin | A47G 33/06 |
| 2003/0223841 A1* | 12/2003 | Brettschneider | F16B 23/0069 |
| | | | 411/403 |
| 2005/0163594 A1* | 7/2005 | Blackburn | A47G 3/00 |
| | | | 411/377 |
| 2007/0212190 A1* | 9/2007 | Monday | B25B 13/485 |
| | | | 411/85 |

\* cited by examiner

US 11,758,901 B2

PORTABLE APPARATUS AND METHOD FOR CREATING A HUNTING BLIND

CROSS-REFERENCE TO RELATED APPLICATION

This application claims priority from U.S. Provisional Patent Application No. 63/122,543, titled "Portable Apparatus and Method for Creating a Hunting Blind", filed on Dec. 8, 2020, the entire contents of which are incorporated by reference herein.

BACKGROUND OF THE INVENTION

Exemplary embodiments of the present invention are generally directed to an apparatus for securing real or artificial brush to a tree or other fixed object to create a blind. The use of brush and other cover for obscuring a person from game while hunting is generally known. However, in some environments, the hunter may wish to hunt from a location that does not have sufficient brush or cover to camouflage the hunter from the game. Accordingly, there is a need for a device that can be easily secured to an available tree, hunting stand, or other object that can be used by the hunter to secure brush to the object to aid in camouflaging the hunter. Because hunters are often unable to carry significant quantities of equipment, this need extends to a device that can be installed without the use of additional tools and which can utilize brush, branches, or other cover that the hunter finds in the field, or which can be used with artificial cover the hunter may carry with him or her. The ability to easily transport the camouflage apparatus to the field is also desirable.

BRIEF SUMMARY OF THE INVENTION

In one aspect, an exemplary embodiment of the present invention is directed to an apparatus for securing brush to a tree or other fixed wooden object to create a hunting blind. The apparatus includes a screw having a head and a tip at opposing ends of the screw. The head has a head diameter and a flange secured to the screw proximate the head. The flange is substantially circular and has a top surface, a base, a flange diameter at least twice the head diameter, a plurality of protrusions situated about an outer edge of the flange and a plurality of recesses. Each of the plurality of recesses is disposed about the outer edge of the flange between two of the plurality of protrusions and each of the plurality of recesses is configured to receive a user's palm, thumb, and/or fingers to rotate the flange and screw. The flange also includes one or more holes or indentations positioned on or adjacent to at least one of the plurality of protrusions.

In another aspect, an exemplary embodiment of the present invention is directed to a method of securing brush to a tree or other fixed wooden object to create a hunting blind. The method includes the steps of gripping a flange of a self-tapping brush securing apparatus, pressing a tip of a screw of the self-tapping brush holder against a fixed wooden object, turning the flange in a clockwise fashion such that the brush holder is screwed into the object, and inserting one or more pieces of brush into one or more hole or recesses disposed on the flange so that the one or more pieces of brush extend away from the object.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
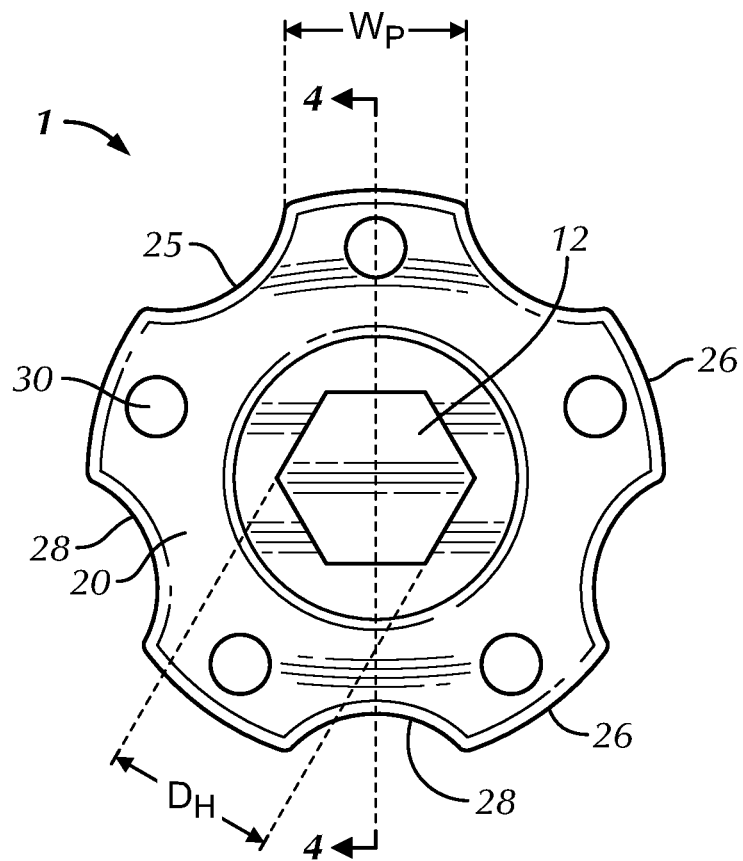
FIG. 1 is a top plan view of an apparatus for securing brush to a tree or other fixed object in accordance with an exemplary aspect of the present invention.
Figure 2:
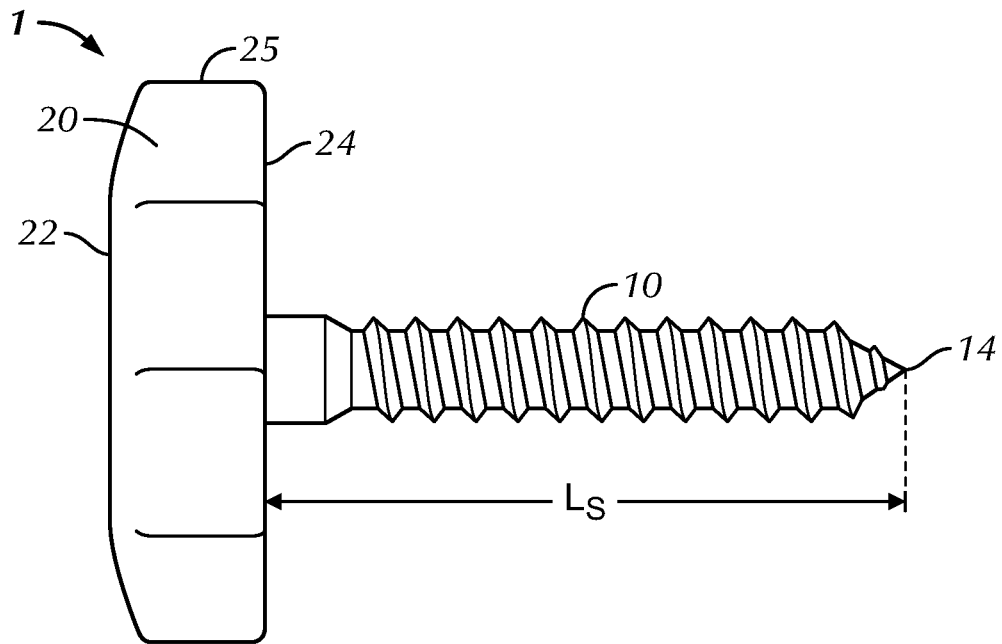
FIG. 2 is a side elevational view of the apparatus of FIG. 1.
Figure 3:
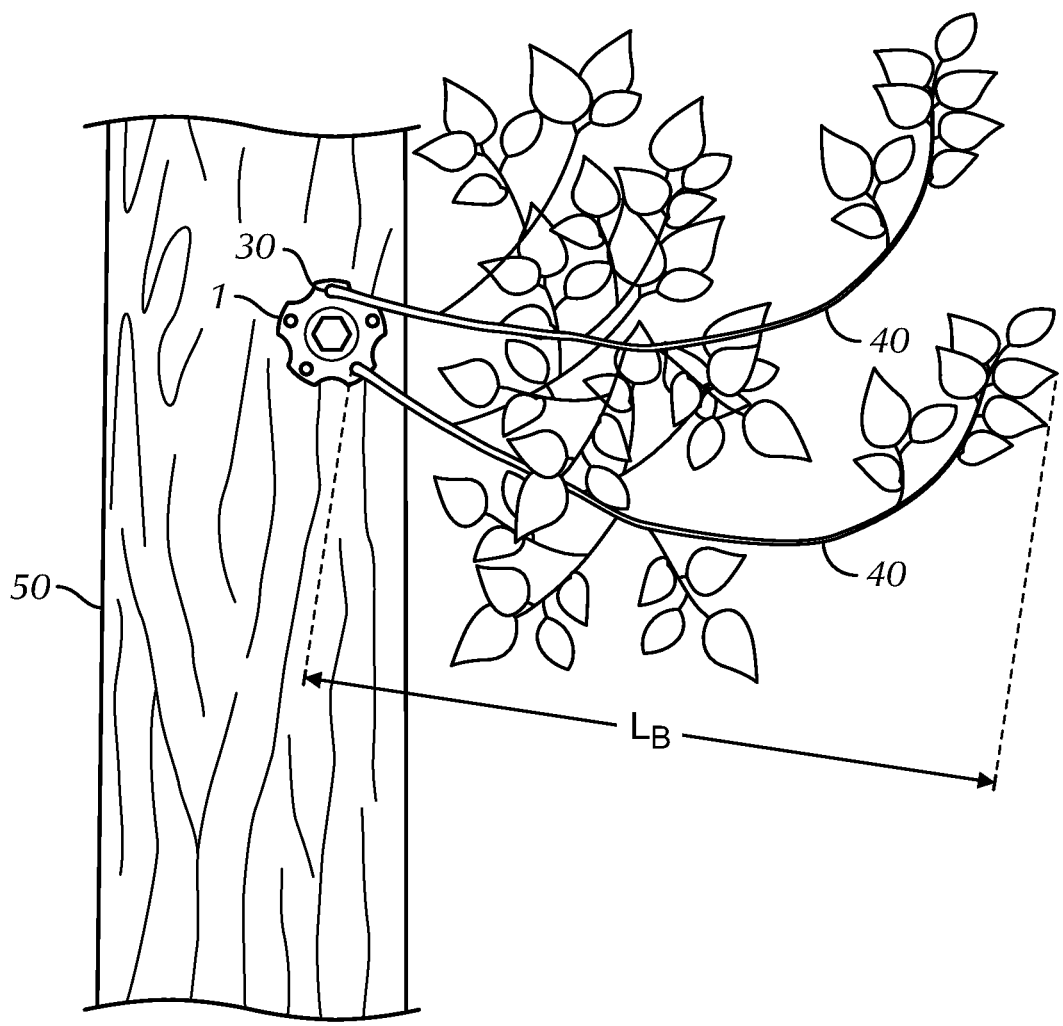
FIG. 3 is a top plan view of the apparatus of FIG. 1 shown attached to a tree or other fixed object.

Certain terminology is used in the following description for convenience only and is not limiting. Unless specifically set forth herein, the terms "a", "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-8, exemplary embodiments of the present invention are directed to a self-tapping apparatus 1, 101 for securing brush to a tree or other fixed wooden object to create a hunting blind preferably having a screw 10, 110 and a flange 20, 120. The screw 10, 110 preferably has a head 12, 112 and a tip 14, 114 at opposing ends of the screw 10, 110. The flange 20, 120 is preferably secured to the screw 10, 110 proximate the head 12, 120. The flange 20, 120 may be secured to the screw 10, 110 by any suitable means, such as by an adhesive, welding, integrally forming, force-fit, or other securing mechanisms and techniques. The flange 20, 120 is preferably substantially circular in shape and preferably constructed of a polymeric material, but is not so limited. The flange 20, 120 preferably has a top surface 22, 122, a base 24, 124, a plurality of protrusions 26, 126 situated about an outer edge 25, 125 of the flange 20, 120, a plurality of recesses 28, 128 disposed about the outer edge 25, 125, and one or more holes or indentations 30, 130 positioned on or adjacent to at least one of the plurality of protrusions 26, 126. More preferably, one hole or indentation 30, 130 is positioned on the top surface 22, 122 of each protrusion 26, 126.

In the exemplary embodiments shown in FIGS. 1-8, the apparatus 1, 101 comprises five protrusions 26, 126 evenly spaced about the outer edge 25, 125 of the flange 20, 120 and five holes 30, 130, with each hole 30, 130 being disposed on the top surface 22, 122 of each protrusion 26, 126. However, the invention is not so limited and may comprise nearly any number of protrusions 26, 126 and holes or indentations 30, 130, such as two protrusions 26, 126 and holes or indentations 30, 130 for a relatively minimal system or twenty protrusions 26, 126 and holes or indentations 30, 130 for a relatively large system.

The screw 10, 1120 of the apparatus 1, 101 preferably extends away from the base 24, 124 of the flange 20, 120, the extension defining a screw length Ls when measured from the base 24, 124 of the flange 20, 120 to the tip 14, 114 of the screw 10, 110. Preferably, the length L is at least one (1) inch, but is not so limited and may be longer or shorter depending on designer preferences, system requirements and the size of the apparatus. The head 12, 112 preferably has a head diameter $D_H$ of approximately one half (½) inch, but is not so limited. The head 12, 112 also preferably has a head depth $D_{HD}$ of approximately one eighth (⅛) inch, but is not so limited. The head 12, 112 is preferably hexagonal in shape, but is not so limited and may be of any shape suitable to engage a wrench or other tool to assist in screwing the screw 10, 110 into a fixed wooden object 50. The screw 10, 110 is preferably constructed of steel, but is not so limited and may be constructed of any suitable material, preferably a metal that is able to take on the general size and shape of the screw 10, 110, withstand the normal operating conditions of the screw 10, 110, and perform the preferred functions of the screw 10, 110, as is described herein. The screw 10, 110 may be integrally formed with or secured to the flange 20, 120, but is not so limited and may be separate from the flange 20, 120 and assembled with the flange during use to facilitate transport of the system to the field by the user.

Each of the plurality of recesses 28, 128 is preferably disposed between two of the plurality of protrusions 26, 126. Each of the plurality of recesses 28, 128 is also preferably configured to receive a user's palm, thumb, and/or fingers so that in operation the user may adequately grip the flange 20, 120 and rotate the flange 20, 120 and screw 10, 110. Preferably, each of the recesses 28, 128 comprises an arcuate shape, but the invention is not so limited and the recesses 28, 128 may take on any shape suitable for delineating spaces between the protrusions 26, 126. The recesses 28, 128 may be disposed solely along the outer edge 25, 125, as shown most clearly in FIG. 1, or may extend from the outer edge 25, 125 on to the top surface 22, 122, as shown most clearly in FIG. 7, or may take on any other suitable configuration for engaging a user's fingers or another tool.

Figure 4:
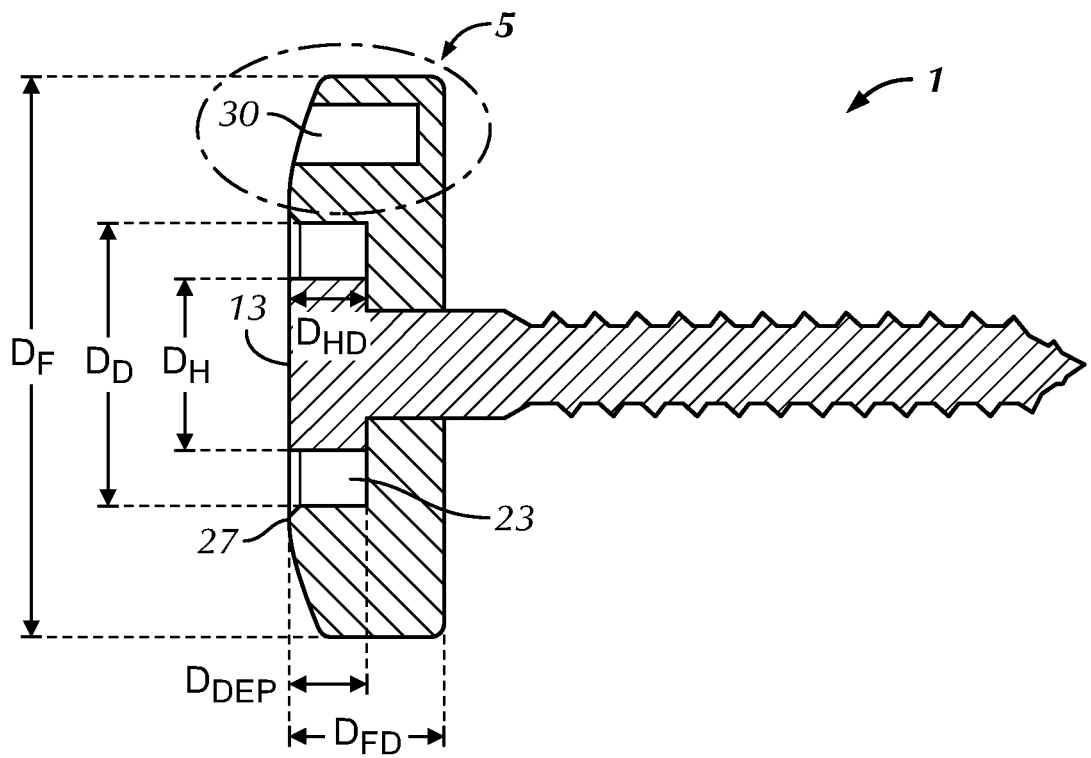
FIG. 4 is a cross-sectional view of the apparatus of FIG. 1, taken along line 4-4 of FIG. 1.
Figure 5:
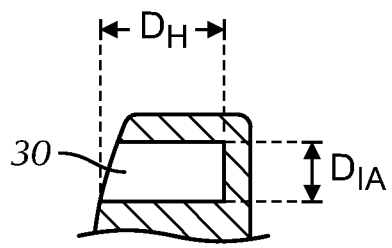
FIG. 5 is an enlarged view of the cross-section depicted in FIG. 4, taken from within shape 5 of FIG. 4.
Figure 6:
FIG. 6 is an enlarged side elevational view of a base of a branch for use with the apparatus of FIG. 1.
Figure 7:
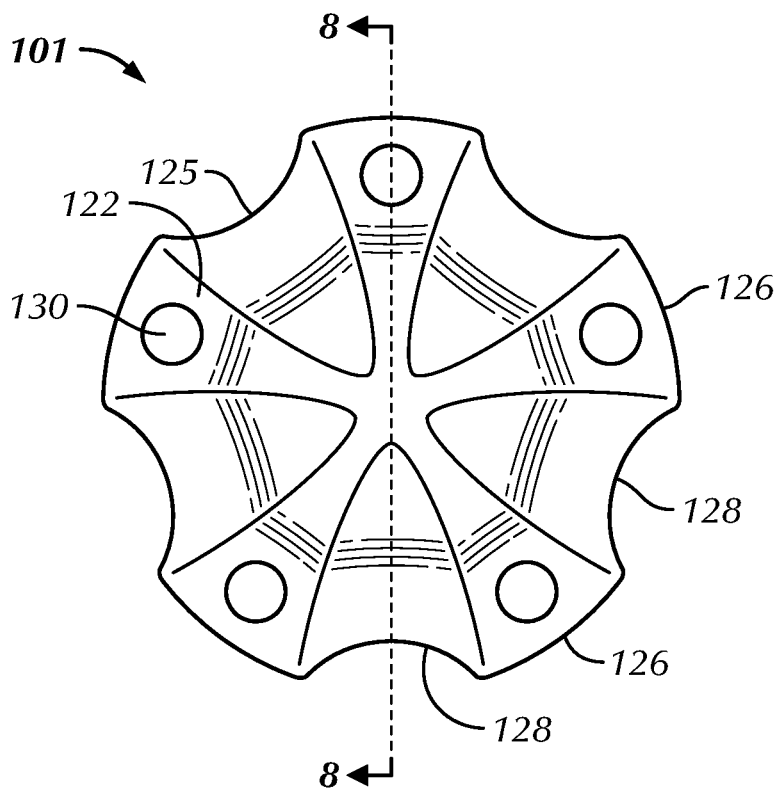
FIG. 7 is a top plan view of an apparatus for securing brush to a tree or other fixed object in accordance with a second exemplary aspect of the present invention.
Figure 8:
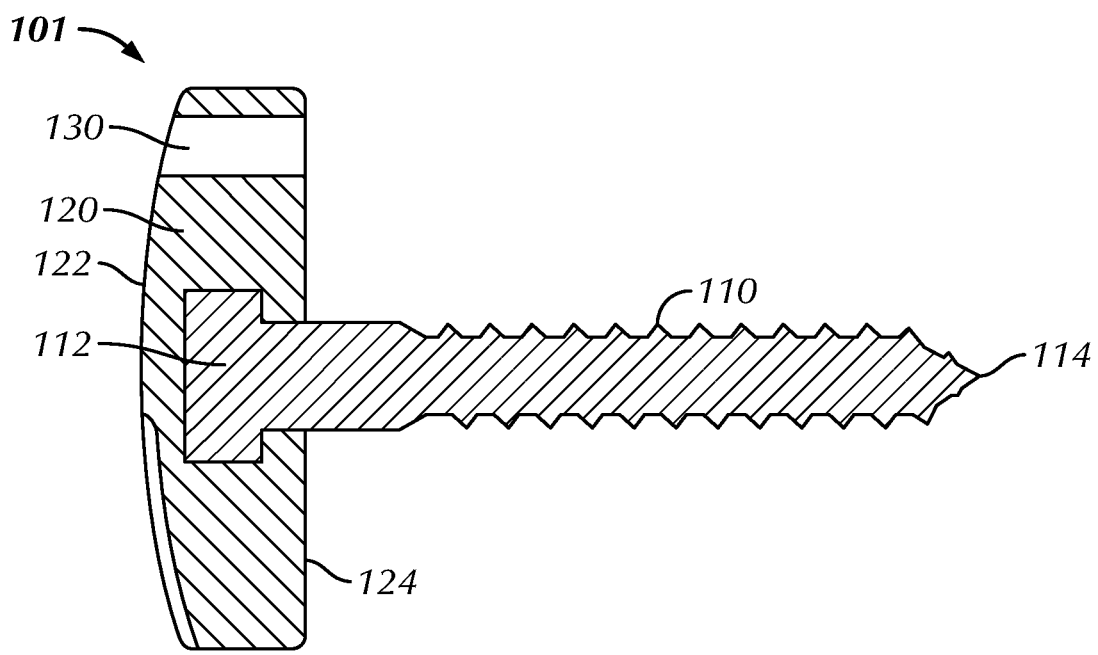
FIG. 8 is a cross-sectional view of the apparatus of FIG. 7 taken along line 8-8 of FIG. 7.

As shown most clearly in FIGS. 4 and 5, the flange 20, 120 preferably has a flange diameter $D_F$ that is at least twice the head diameter $D_H$. The flange 20, 120 also preferably has a flange depth $D_{FD}$ of approximately one half (½) inch to one (1) inch. In turn, each of the protrusions 26, 126 preferably has a protrusion width $W_P$ of at least one quarter (¼) inch. The flange 20, 120 also preferably has a depression 23 and an outer area 27 on the top surface 22. The depression 23 is preferably configured to receive the screw 10 by having a depression diameter DD larger than the head diameter $D_H$ of the head 12, 112 of the screw 10, 110 and a depression depth $D_{DEP}$ that is approximately equal to or greater than the head depth $D_{HD}$ of the head 12, 112 of the screw 10, 110. In this way, the depression 23 of the exemplary embodiment shown in FIGS. 1-6 is configured to receive the head 12, 112 of the screw 10, 110 such that a top surface 13 of the head 12, 112 of the screw 10, 110 is substantially flush with the outer area 27 of the top surface 22, 122 of the flange 20, 120. The flange 20, 120 is preferably a green or brown color so as to blend in with surrounding trees or foliage, but is not limited to any particular color. As a non-limiting example, the flange 20, 120 and head 12, 112 may include a camouflage pattern thereon, have a color customized for the particular area where the hunter is hunting, or have a removable and replaceable cover with a variety of surface treatments that are customized to camouflage the system to the desired environment. The removable and replaceable cover may also include a distinct bright color or pattern that stands out in the environment that may be applied when the hunter leaves the system at their stand so that the hunter is readily able to locate the stand upon return. As shown most clearly in FIG. 8, the head 112 of the screw 110 may be fully enclosed by the flange 120.

Referring again to all of FIGS. 1-8, each of the one or more holes or indentations 30, 130 is preferably configured to receive and secure a real or artificial tree branch 40. Preferably, the holes or indentations 30, 130 each have a depth $D_H$ of at least one half (½) inch and a diameter $D_{IA}$ of approximately one eighth (⅛) inch, but the invention is not so limited. Each tree branch 40 preferably has a shaft diameter $D_S$ and a branch length $L_B$. More preferably, each tree branch 40 has a shaft diameter $D_S$ of approximately one eighth (⅛) inch and a branch length $L_B$ of at least twelve (12) inches, but the invention is not so limited and branches 40 of any shaft diameter $D_S$ and branch length $L_B$ may be used to suitable create a hunting blind. The system may also include a locator branch (not shown) that has a bright color or distinct visual appearance that facilitates visual identification by the hunter so that the hunter is able to re-locate their stand or to help a second hunter to locate the stand by visually locating the locator branch.

In use, a user may utilize the brush securing apparatus 1, 101 to create a hunting blind by gripping the flange 20, 120 of the brush securing apparatus 1, 101 with his or her hand, fingers, palm, or any suitable tool. The user may then press the tip 14, 114 of the screw 10, 110 of the brush securing apparatus 1, 101 against the fixed wooden object 50, such as a tree, utility pole, tree stand, or the like. The user may then turn the flange 20, 120 in a clockwise fashion to enable the screw 10, 110 to screw into the fixed wooden object 50 until the brush securing apparatus 1, 101 is secured to the fixed wooden object 50. Then, a user may obtain one or more real or artificial tree branches 40 and insert the one or more tree branches 40 into the one or more holes or indentations 30, 130 on the flange 20, 120 such that the one or more branches 40 extend from the brush securing apparatus 1, 101 and the fixed wooden object 50 and provide cover for the user to camouflage himself or herself behind.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the present disclosure.

I claim:

1. An apparatus for securing brush to a tree or other fixed wooden object to create a hunting blind, the apparatus comprising:
    a screw having a head and a tip at opposing ends of the screw, the head having a head diameter; and
    a flange secured to the screw proximate the head, the flange being substantially circular and having:
        a top surface;
        a base;
        a flange diameter at least twice the head diameter;
        a plurality of protrusions situated about an outer edge of the flange;
        a plurality of recesses, each of the plurality of recesses being disposed about the outer edge of the flange between two of the plurality of protrusions and each of the plurality of recesses being configured to receive a user's palm, thumb, and/or fingers to rotate the flange and screw; and
        one or more holes or indentations positioned on or adjacent to at least one of the plurality of protrusions.

2. The apparatus of claim 1, wherein the plurality of protrusions comprises five protrusions evenly spaced about the outer edge of the flange.

3. The apparatus of claim 2, wherein the one or more holes or indentations comprises five holes, each hole disposed on one of the plurality of protrusions.

4. The apparatus of claim 1, wherein the screw extends from the base of the flange.

5. The apparatus of claim 4, wherein the screw extends from the base of the flange by at least one (1) inch when measured from the base of the flange to the tip of the screw.

6. The apparatus of claim 1, wherein each of the one or more holes or indentations is configured to receive and secure a real or artificial tree branch.

7. The apparatus of claim 6, wherein the one or more holes or indentations have a depth of at least one half (½) inch and a diameter of approximately one eighth (⅛) inch.

8. The apparatus of claim 6, wherein the artificial tree branch has a shaft diameter and a length.

9. The apparatus of claim 8, wherein the shaft diameter is approximately one eighth (⅛) inch.

10. The apparatus of claim 8, wherein the length of the artificial tree branch is at least twelve (12) inches.

11. The apparatus of claim 1, wherein the screw head diameter is approximately one half (½) inch.

12. The apparatus of claim 1, wherein the flange has a flange depth of approximately one half (½) to one (1) inch and each of the plurality of protrusions has a protrusion width of at least one quarter (¼) inch.

13. The apparatus of claim 1, wherein the top surface of the flange is configured to receive the head of the screw and comprises a depression having a depression diameter larger than the head diameter of the screw and a depression depth approximately equal to or greater than a head depth of the screw.

14. The apparatus of claim 1, wherein the top surface of the flange comprises a depression and an outer area, the depression being configured to receive the head of the screw such that a top surface of the head of the screw is substantially flush with the outer area of the top surface of the flange.

15. The apparatus of claim 1, wherein the head of the screw is hexagonal in shape.

16. The apparatus of claim 1, wherein each of the plurality of recesses comprises an arcuate shape.

17. The apparatus of claim 1, wherein the flange is constructed of a polymeric material.

18. The apparatus of claim 1, wherein the flange is secured to the screw with an adhesive.

19. The apparatus of claim 1, wherein the flange comprises a green or brown color.

* * * * *